No. 834,080. PATENTED OCT. 23, 1906.
J. H. SHEARN.
PAPER BOX MACHINE.
APPLICATION FILED APR. 12, 1905.

9 SHEETS—SHEET 1.

Witnesses:
H. L. Sprague
E. L. Smith

Inventor:
Joseph H. Shearn
by Chapin & Co.
Attorneys

No. 834,080. PATENTED OCT. 23, 1906.
J. H. SHEARN.
PAPER BOX MACHINE.
APPLICATION FILED APR. 12, 1905.

9 SHEETS—SHEET 4.

Witnesses.
H. L. Sprague
E. L. Smith

Inventor.
Joseph H. Shearn
by Chapin & Co.
Attorneys.

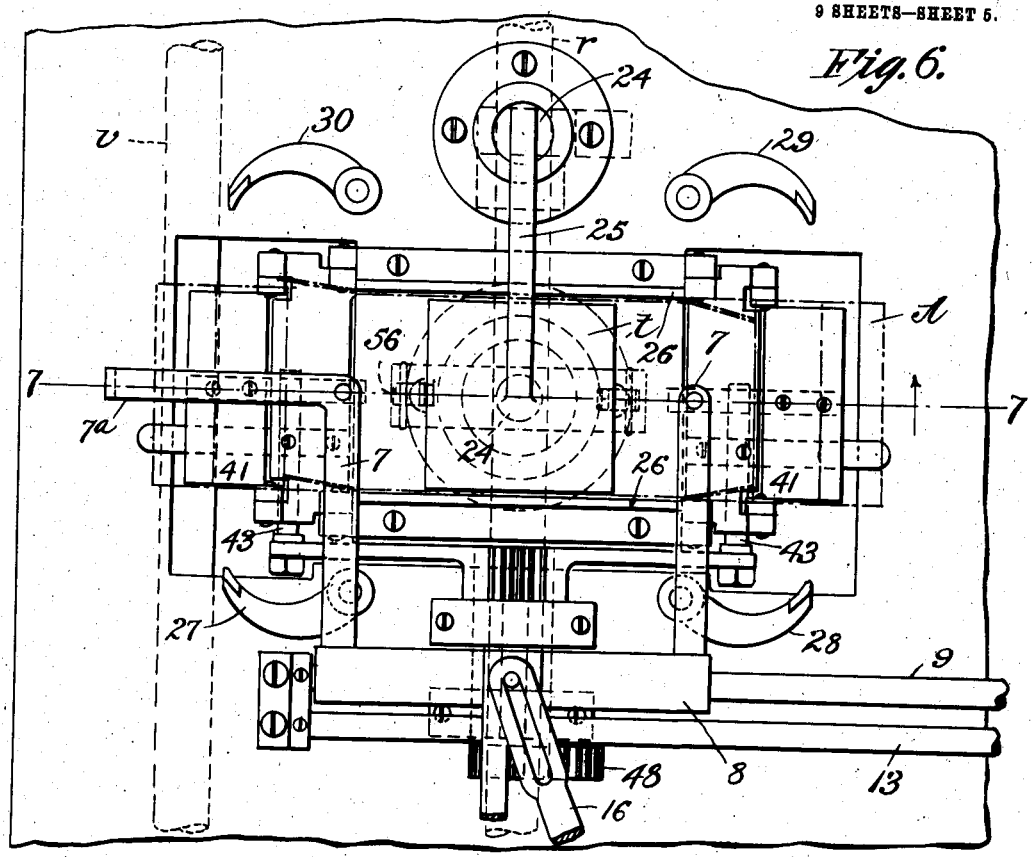
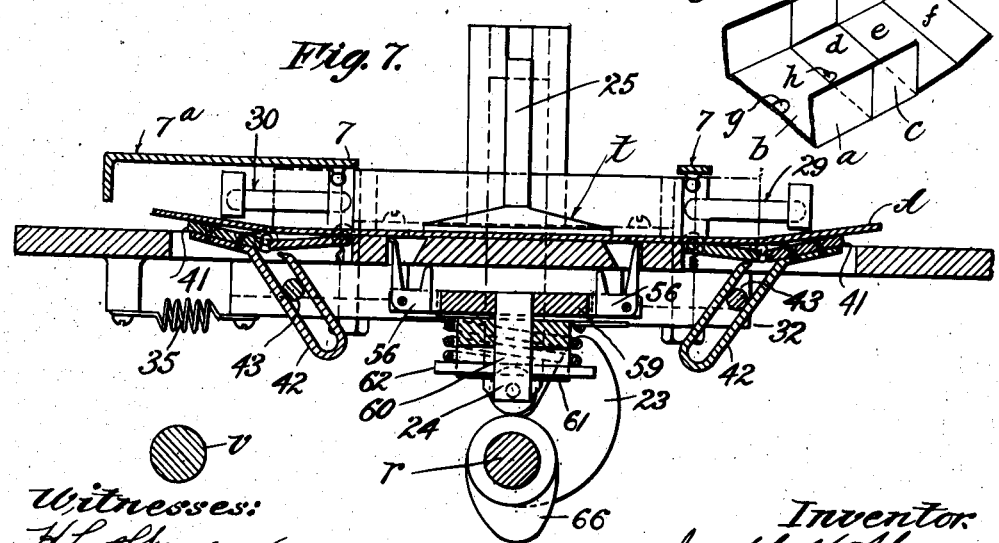

No. 834,080. PATENTED OCT. 23, 1906.
J. H. SHEARN.
PAPER BOX MACHINE.
APPLICATION FILED APR. 12, 1905.

9 SHEETS—SHEET 6.

Witnesses:
H. L. Sprague
E. L. Smith

Inventor:
Joseph H. Shearn
by Chapin & Co.
Attorneys.

No. 834,080. PATENTED OCT. 23, 1906.
J. H. SHEARN.
PAPER BOX MACHINE.
APPLICATION FILED APR. 12, 1905.

9 SHEETS—SHEET 7.

Witnesses:
H. L. Sprague
E. L. Smith

Inventor.
Joseph H. Shearn
by Chapin & co
Attorneys

No. 834,080. PATENTED OCT. 23, 1906.
J. H. SHEARN.
PAPER BOX MACHINE.
APPLICATION FILED APR. 12, 1905.

9 SHEETS—SHEET 8.

Witnesses:
H. L. Sprague
E. L. Smith

Inventor:
Joseph H. Shearn
by Chapin & Co.
Attorneys

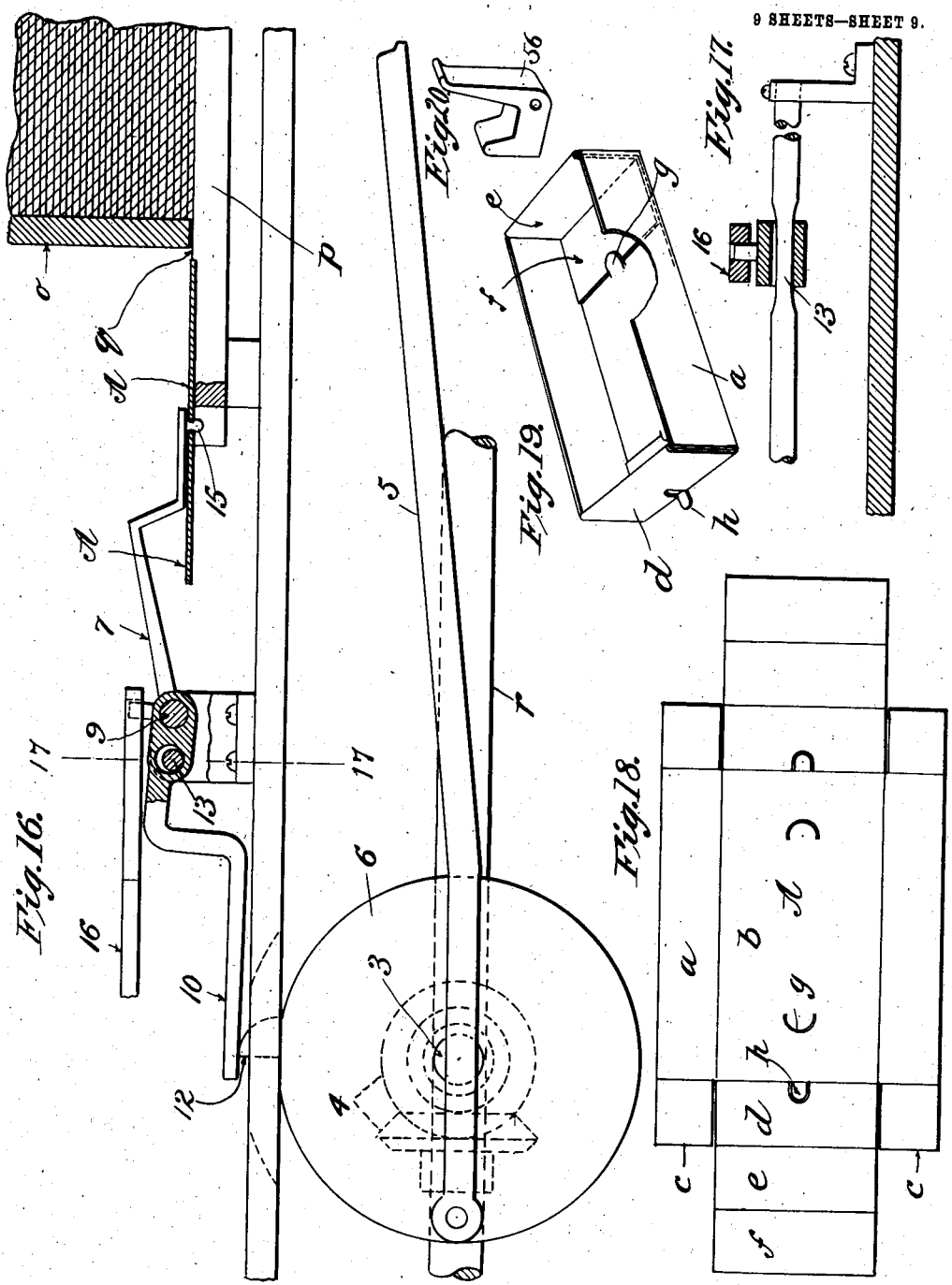

UNITED STATES PATENT OFFICE.

JOSEPH H. SHEARN, OF LEEDS, MASSACHUSETTS.

PAPER-BOX MACHINE.

No. 834,080.  Specification of Letters Patent.  Patented Oct. 23, 1906.

Application filed April 12, 1905. Serial No. 255,133.

*To all whom it may concern:*

Be it known that I, JOSEPH H. SHEARN, a citizen of the United States of America, residing at Leeds, in the county of Hampshire and State of Massachusetts, have invented new and useful Improvements in Paper-Box Machines, of which the following is a specification.

This invention relates to machines for making boxes, or, more properly, for folding box-blanks, and has special reference to a machine for folding the specific style of box-blank which is described in Letters Patent of the United States issued to Arthur C. Jordan on April 22, 1902, and numbered 698,117.

The object of the invention is to provide a machine to fold these blanks into box form automatically, all as set forth in the following specification and clearly summarized in the claims appended thereto, the construction being fully illustrated in the accompanying drawings, in which—

Figure 1:
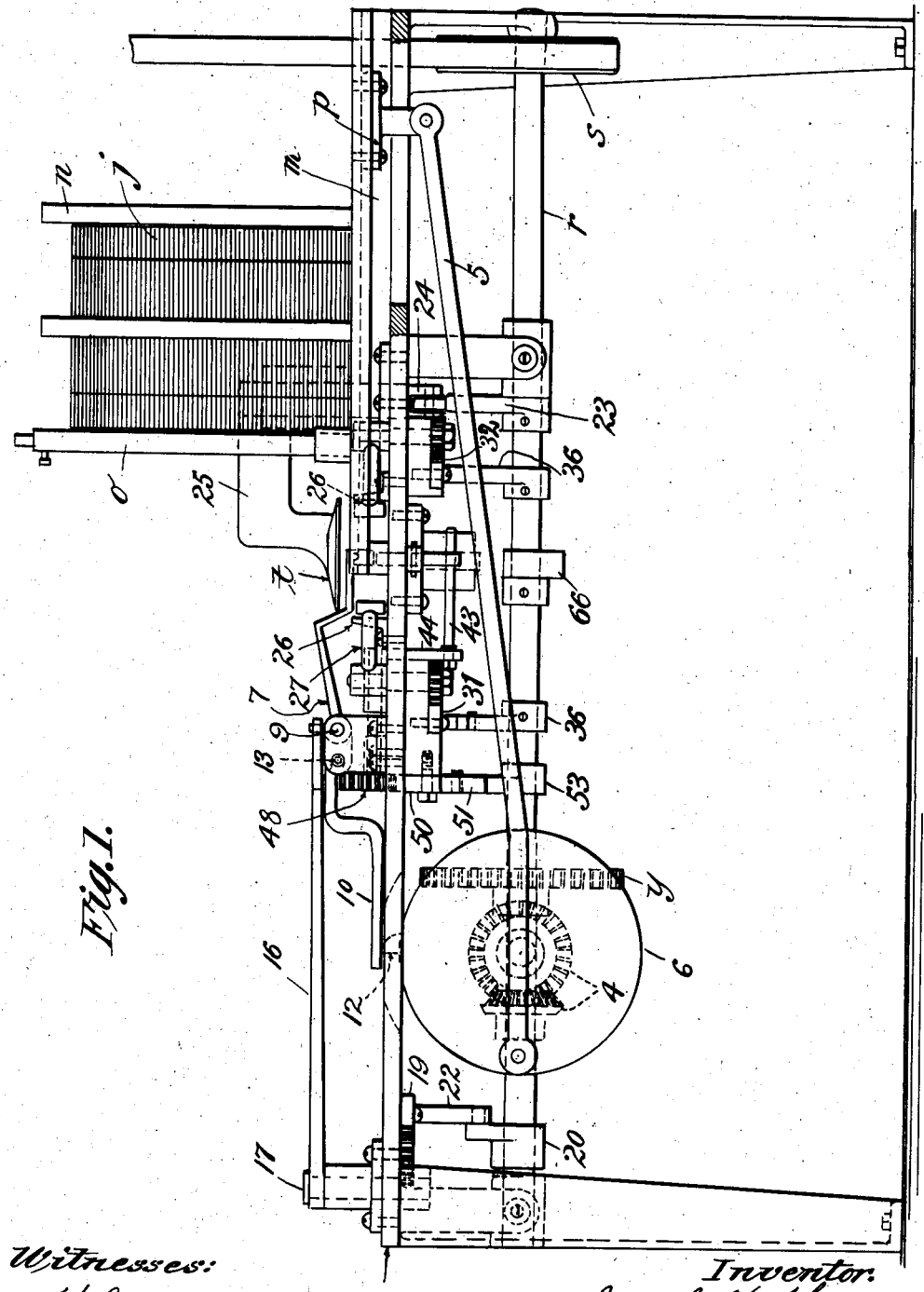
Figure 2:
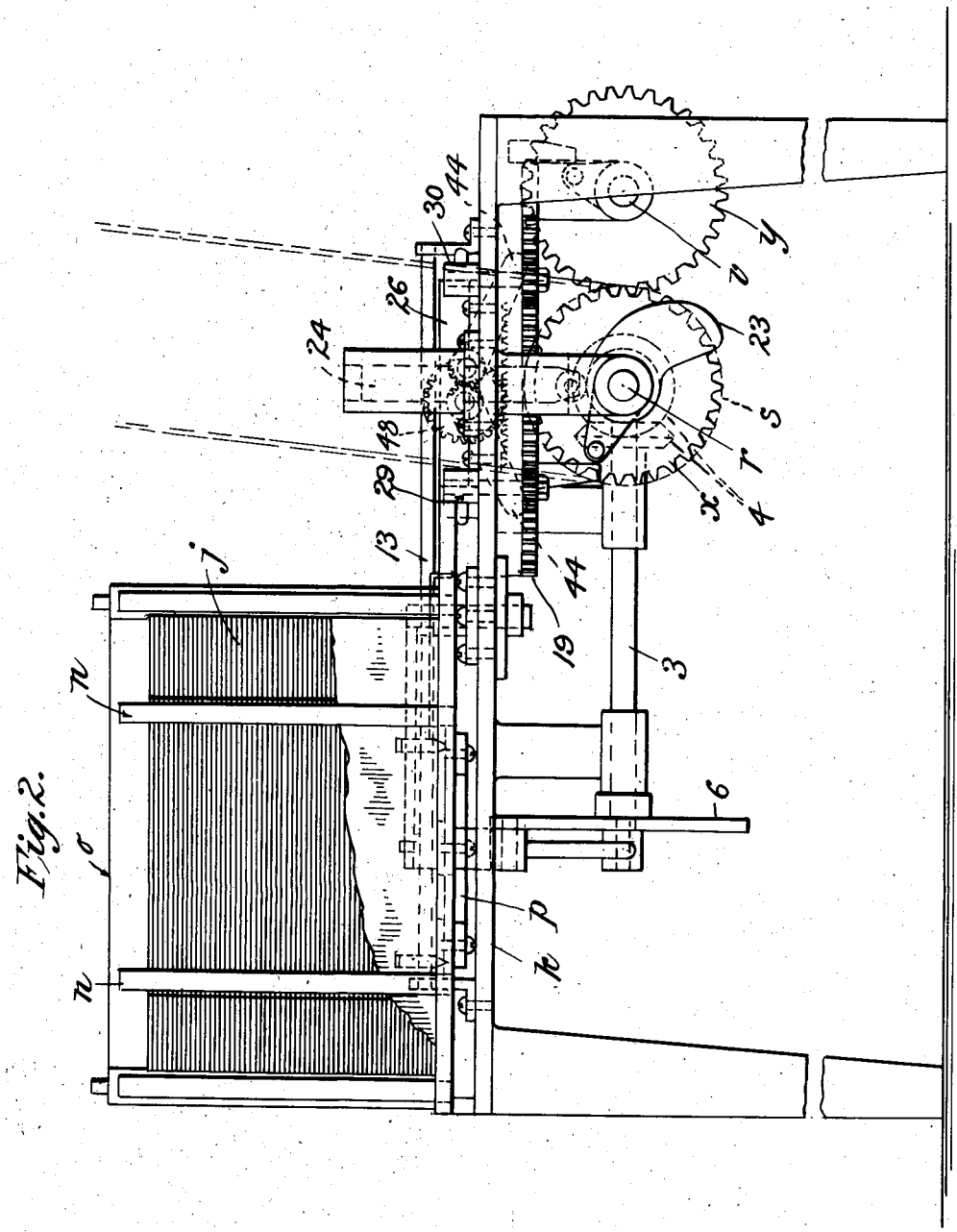
Figure 3:
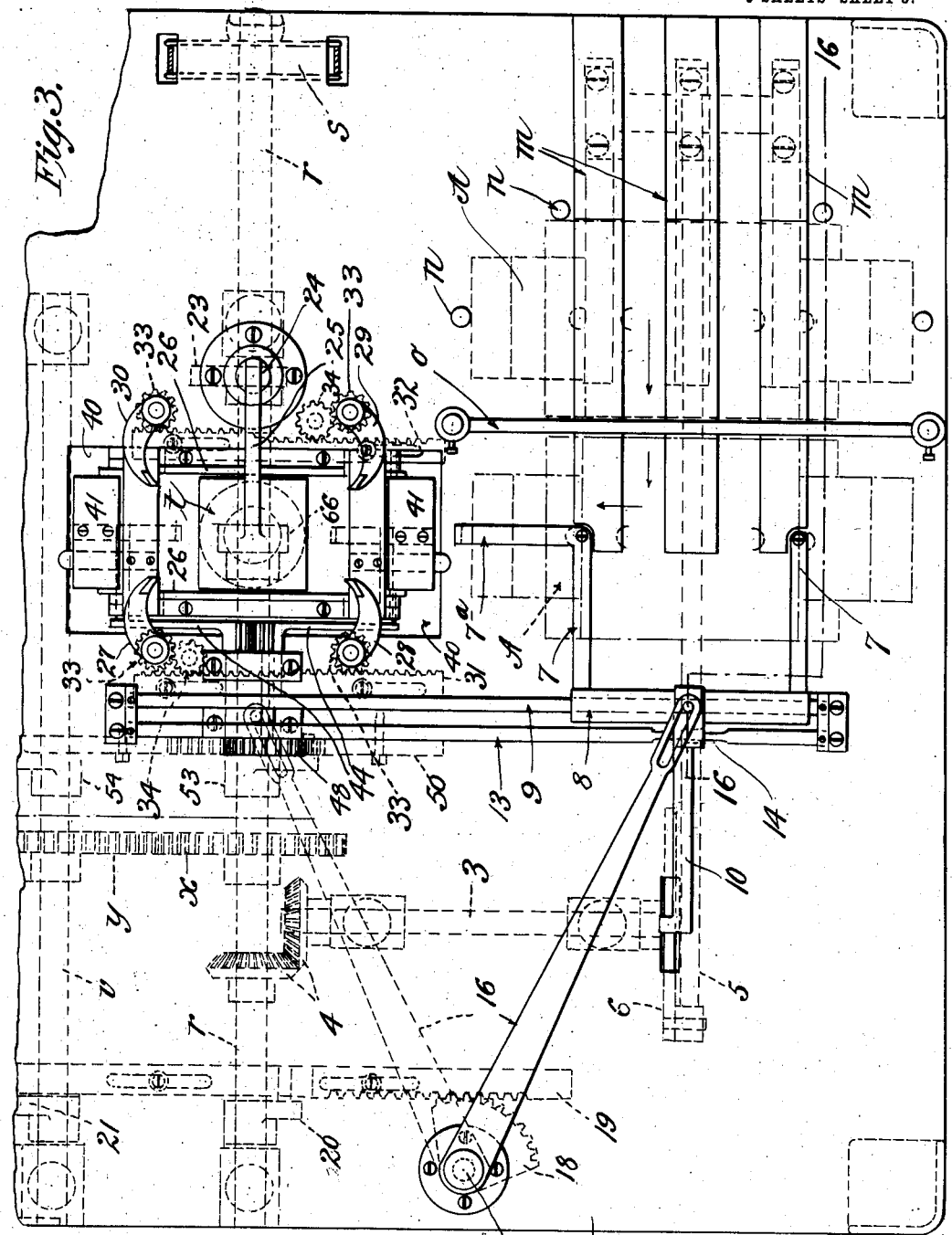
Figure 4:
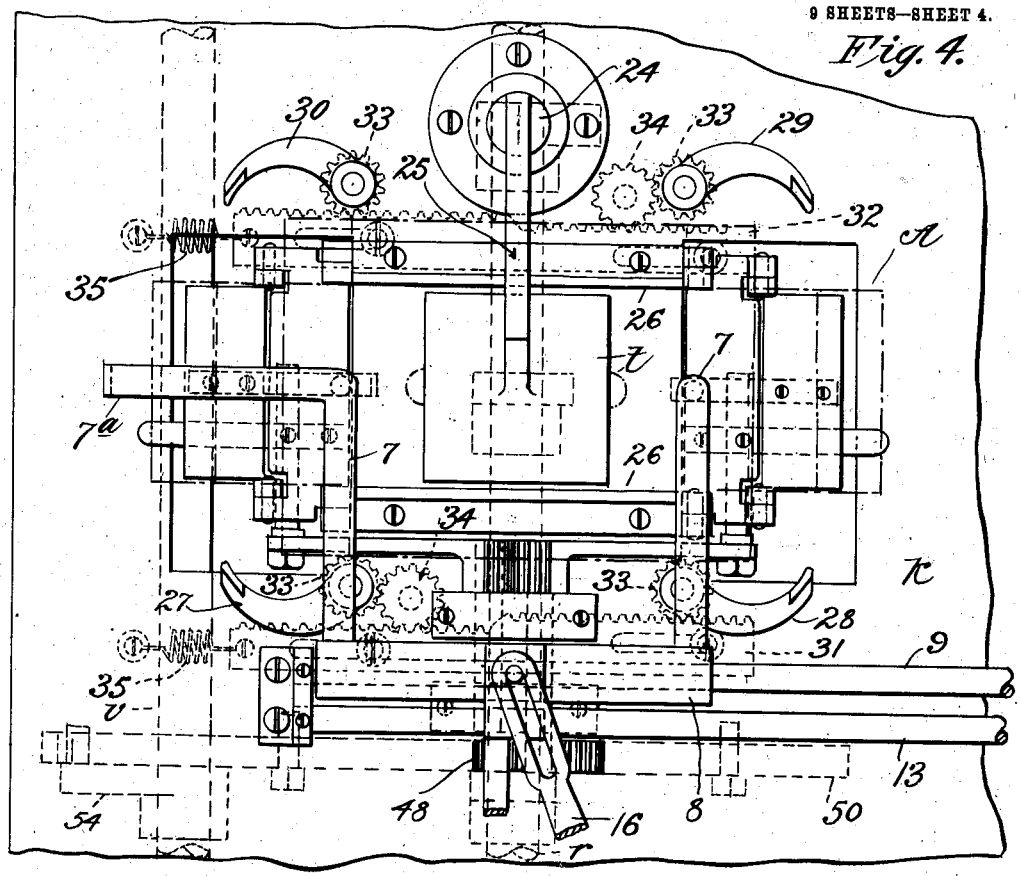
Figure 5:
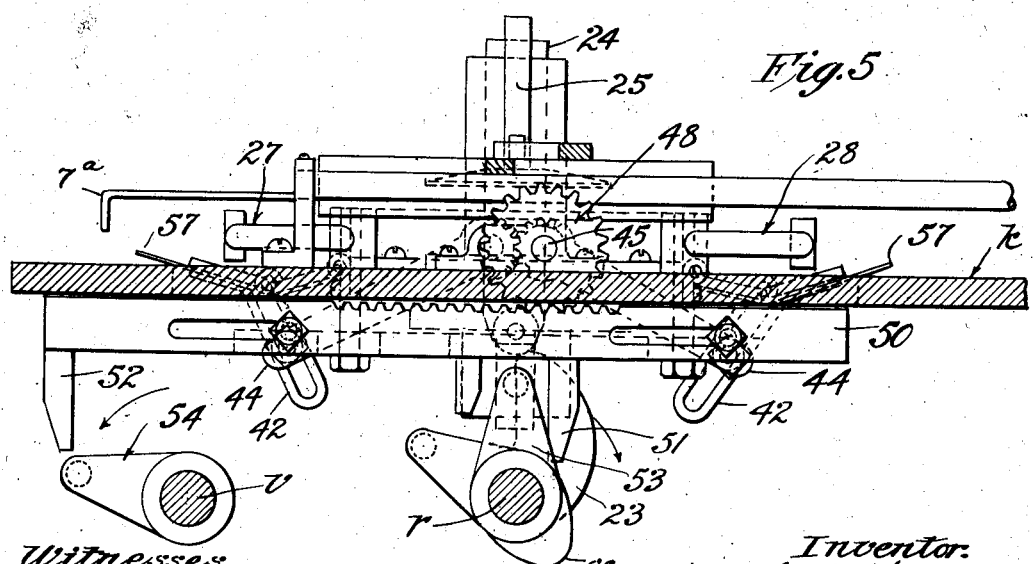
Figure 9:
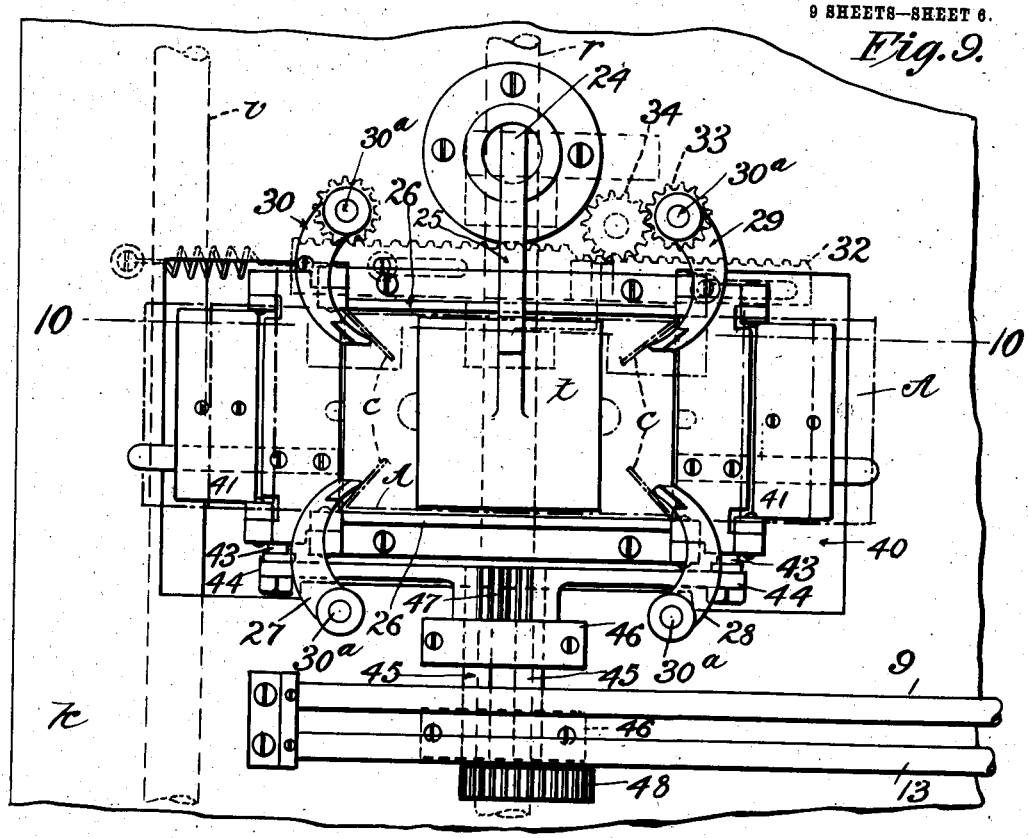
Figures 10, 11:
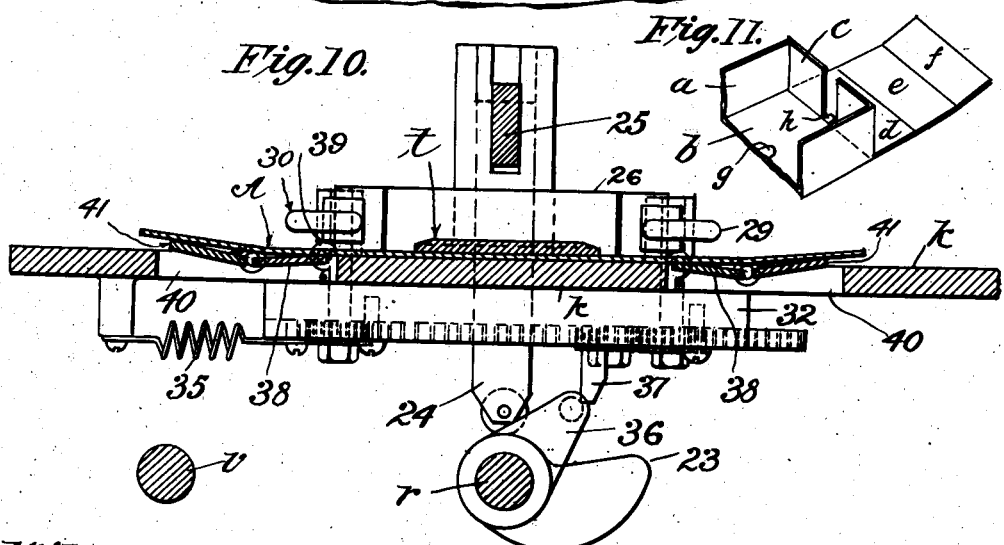
Figure 12:
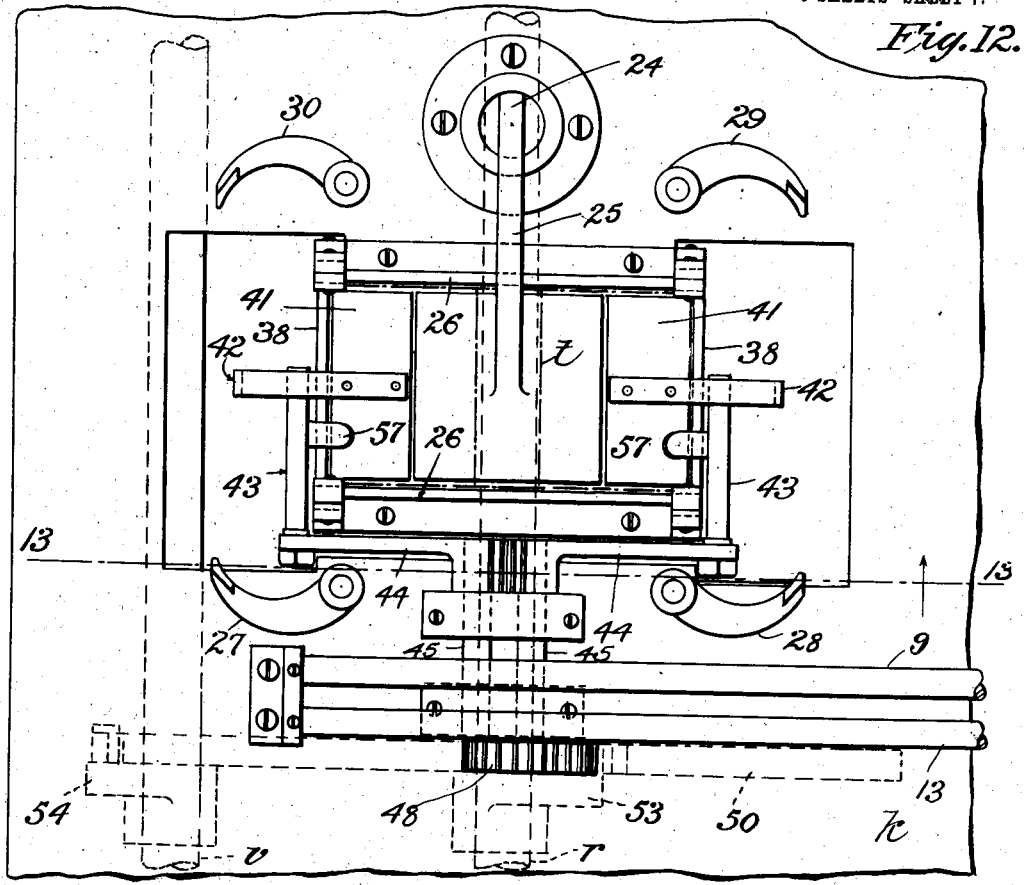
Figure 13:
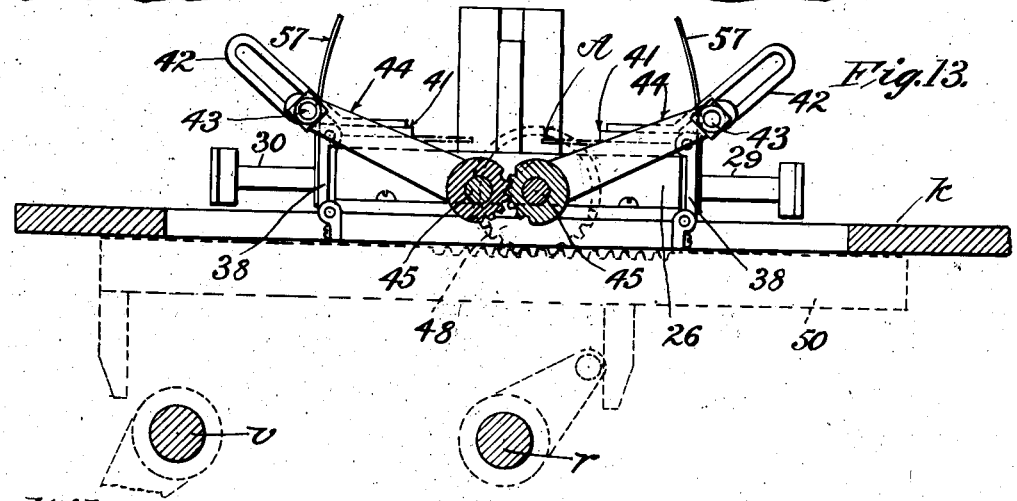
Figure 14:
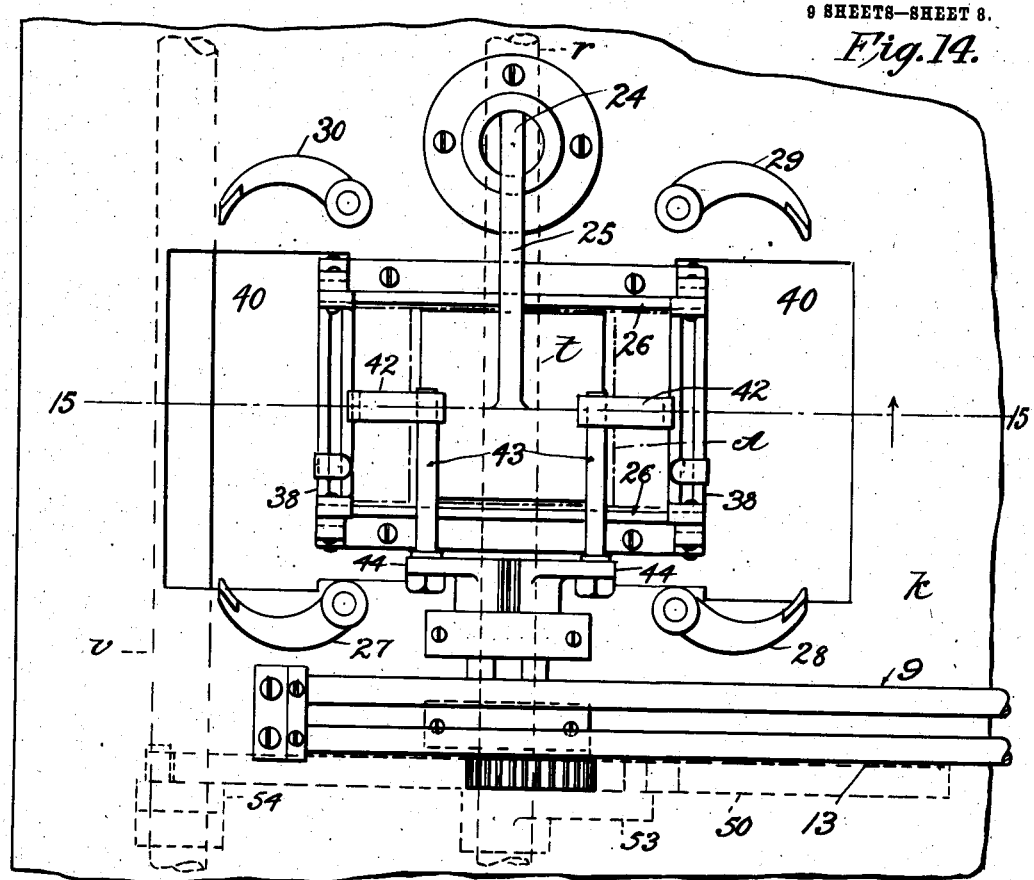
Figure 15:
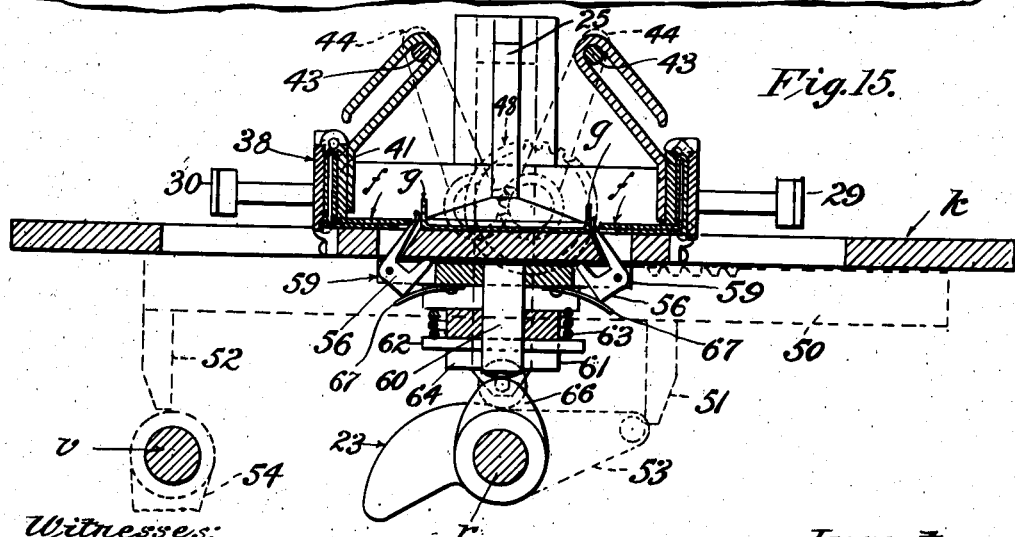

Figure 1 is a side elevation of a machine embodying the invention. Fig. 2 is an end elevation of the same looking from the right of Fig. 1. Fig. 3 is a plan view of the machine, part of the table being broken away. Fig. 4 is a plan view of the folding-box of the machine in the position the parts occupy after a blank has been located therein, the blank being shown in dotted lines, this figure and those following being on a larger scale than the preceding views. Fig. 5 is an elevation of the parts shown in Fig. 4 projected down therefrom, the table being in section. Fig. 6 is a plan view similar to Fig. 4, the plunger being down in the folding-box. Fig. 7 is a sectional elevation of the parts on line 7 7 of Fig. 6 in the position shown in Fig. 6. Fig. 8 is a perspective view of one end of a box in the position it occupies in the folding-box in Fig. 7. Fig. 9 is a plan view showing the infolding of the corner-flaps of the blank prior to turning the end flaps thereover. Fig. 10 is a sectional elevation of Fig. 9 on line 10 10 of that figure. Fig. 11 is a perspective view of the end of a box-blank in the position it occupies in Fig. 10. Fig. 12 is a plan view of the machine, showing the end flaps turned over the corner-flaps. Fig. 13 is a sectional elevation of the same on the line 13 13, Fig. 12. Fig. 14 is a plan view of the machine showing the end flaps turned entirely over the corner-flaps, the locking-flaps being pressed against the bottom of the box. Fig. 15 is a sectional elevation of the parts shown in Fig. 14, the plane of the section being on line 15 15, Fig. 14. This section shows the raised position of the locking-tongue, under which the locking-flap extends. Fig. 16 is a side elevation, on a still larger scale, of the means of engagement between the feed-arms and a blank and shows the construction of the pivotal support of these arms, a portion of the slide which extends under a pile of blanks being also shown. Fig. 17 is a sectional elevation of the supporting-shaft of the feed-arms, the bearing of the latter being shown in section, the plane of which is on line 17 17, Fig. 16. Fig. 18 is a plan view of the box-blank the machine is adapted to fold; and Fig. 19 is a perspective view of the folded box, one side of which is broken away to show the relation of the locking-flap and locking-tongue. Fig. 20 is a perspective view of one of the angular levers which raises the locking-tongues as shown in Fig. 15.

The box-blank which this machine is constructed to fold into box form is illustrated in Fig. 18 of the drawings, the folded box being shown in Fig. 19.

The blank is folded by first bending the side flaps $a$ at right angles to the body $b$ of the blank by forcing the latter into a folding-box of the width of the body, a suitable plunger performing this operation in the usual manner. Next the corner-flaps $c$ are infolded transversely of the ends of the body, as shown in Fig. 11. Then the end flaps comprising the sections $d$, $e$, and $f$ are folded over the corner-flaps, $d$ being located outside thereof, $e$ on the inside, and $f$ constituting the locking-flap, which is disposed along the bottom of the box, as shown in Fig. 19, extending under the locking-tongue $g$, punched out of the bottom of the box. The blank is also provided with another tongue $h$ at each end and punched out of the sections $d$, as shown, the base of which tongues being on the bottom folding-line of the ends of the box, whereby they may constitute pulls for withdrawing the box from its tubular container. (Not shown.)

This brief description of the method of folding the blank will be of assistance in understanding the description of the machine which follows.

A pile of blanks $j$ is arranged, as shown in Figs. 1, 2, and 3, on the table $k$ of the machine, the blanks being supported on slightly-raised ribs $m$, the lengthwise dimension of the blank being transversely located on the ribs, the blanks being held in position by means of the posts $n$ and a vertically-adjustable gate $o$, well known in machines of this class. A feeding device for these blanks has a sliding movement beneath the pile of blanks and is what is known as the "shovel-feed" and consists in a carrier or slide $p$, having a shoulder $q$ thereon movable in slots in the table between the ribs $m$, said shoulder $q$ extending just above the level of the table to engage with the rear edge of the blank and move the same out beneath the gate $o$ into position to be engaged by the feeding devices (shown in Figs. 3 and 16 particularly) and which have a reciprocating sliding movement rectangularly of the initial movement of the blank above referred to, the folding-box of the machine being in position to receive the blank which is located therein by said referred-to rectangularly-moving part of the feeding mechanism. The blank as a whole will be indicated herein by A.

The driving mechanism of the machine consists of a shaft $r$, rotated by a driving-pulley $s$. On this shaft is located a number of cams, to be described farther on, whereby the blanks are moved into position over the folding-box, and whereby the folding-wings for the end flaps and the folding-fingers for turning in the corner-flaps of the blank are actuated, and whereby the plunger $t$ has imparted thereto vertical movements, and whereby the locking-tongues $g$ of the blank are raised, as shown in Fig. 15, and coöperating with this shaft $r$ is another shaft $v$, parallel therewith and having cams thereon, whose function will be hereinafter described, these two shafts being rotated in opposite directions by gear connections consisting of the gear $x$ on the shaft $r$ and the gear $y$ on the shaft $v$, the position of which is clearly shown in Figs. 2 and 3. Both of these shafts are located beneath the table $k$ and parallel to the length thereof. Also beneath the table is a short shaft 3, rotatively connected with the shaft $r$ by the beveled gears 4. The function of the shaft 3 is to withdraw a blank from beneath the pile of blanks A and locate it, as described, in line with the folding-box, as shown in Fig. 6, a blank being shown in this position in dotted lines in said Fig. 3.

The withdrawal of the blank from beneath the pile of blanks is effected, as stated, by the sliding carrier $p$, which by a connecting-rod 5 has reciprocating movement imparted thereto by the pivotal connection of one end thereof to a disk 6 on the shaft 3. (See Figs. 1 and 3.)

The feeding-fingers which engage the blanks are indicated by 7, and they are supported, as shown in Fig. 3, at opposite ends of a long sleeve 8, slidably supported on a rod 9, parallel with the side of the folding-box, and connected to this sleeve or forming part thereof is a rearwardly-extending arm 10, the end of which is located over the periphery of the disk 6, on which there is a cam projection 12, whereby this arm is moved in a vertical plane.

Parallel with and in the same plane as the rod 9 is a second rod 13, a portion 14 of which is reduced in diameter, as shown in Figs. 3 and 16, which rod passes loosely through the arm 10, the reduced portion 14 of the rod being so located that when the feeding-fingers 7 are in the position shown in Fig. 3, at which time the cam 12 depresses the forward ends of said fingers, the latter and the arm 10 may have a certain degree of rocking movement on the rod 9, but after the blank has been engaged by the fingers by the forcing of the buttons 15 on the end of the latter down through the cuts made in the blank to provide the tongues $h$ the sleeve 8 is moved toward the folding-box, and as soon as the normal diameter of the rod 13 is reached this sleeve becomes non-rotatable on the rod 9 during the rest of its movement, and, furthermore, when that part of the rod 13 having a normal diameter is reached it tends to elevate the forward end of the fingers 7, and thereby elevate the blank slightly.

That one of the fingers 7 which is nearest the folding-box has a rectangularly-disposed portion $7^a$, which extends toward the folding-box and serves to push out of the latter a completed box.

The sliding movement of the feeding-fingers 7 toward and from the folding-box is effected by means of an arm 16, supported on a vertically-disposed shaft 17, which extends through the table and has secured to its lower end the segmental gear 18, which meshes with a sliding rack 19 and which has imparted thereto reciprocating movements in opposite directions by means of the cams 20 and 21, located, respectively, on the shafts $r$ and $v$, (see Figs. 1 and 3,) which rotate, as stated, in opposite directions, depending arms 22 being secured to the under side of the rack at each end thereof, as seen clearly in said Fig. 1, said cams contacting arms 22 at proper intervals to produce such reciprocating movements of the rack.

When the blank A is moved to a position over the folding-box, the plunger $t$ is elevated sufficiently to allow the blank to pass under it, as shown in Fig. 1, and as soon as the blank is in position the plunger, which is gravity-actuated, is allowed to drop by the passing out of the plunger-cam 23 from under the post 24, with which the plunger is connected by an arm 25, as shown in the various views from Figs. 4 to 15, inclusive.

The bottom of the folding-box is the surface of the table $k$, and the two longitudinal sides of the box consist of the vertical ribs 26. Thus when the plunger falls the side and corner flaps $a$ and $c$ are turned up at right angles to the body portion b, this position of the parts being shown in Figs. 6 and 7 and a portion of the blank at this stage in Fig. 8. Next the corner-flaps c are infolded transversely to the side flaps a, being swung inward to the position shown in Fig. 11, and this infolding movement takes place while the plunger is down, the feeding-fingers 7 having meanwhile swung back again to the position shown in Fig. 3 ready to pick up a new blank, the ends of the fingers sliding over the forward portion of the plunger t, which descends below the plane of their movement.

The infolding of the corner-flaps c is effected by four curved folding-fingers 27 and 28 operating on one side and 29 and 30 on the other side of the box, the two extreme positions of these fingers being shown in Figs. 6 and 9 in plan. These fingers are supported on vertically-disposed studs $30^a$, extending through the table, and, as shown in Fig. 4, are connected with two racks 31 and 32, slidably supported beneath the table, the fingers 28 and 30 being provided with pinions 33, which engage the racks directly, and the fingers 27 and 29 being connected with the rack by means of an intermediate pinion 34, which is in mesh with the racks and with the finger-pinions 33, whereby the folding-fingers may simultaneously swing toward a common center to infold the corner-flaps of the blank. This is effected by imparting at the proper time—that is, just after the feeding-fingers 7 have been withdrawn—sliding movements to the two racks 31 and 32, which movements take place against the tension of springs 35 and are effected by the engagement of a cam with each slide, both cams being on shaft r, and one of which is shown in Fig. 10 and is indicated by 36. As soon as this cam 36 passes beneath the projections 37 on the racks the springs 35 throw the latter quickly in the reverse direction in time to take the fingers out of the way of the folding-wings for the end flaps, which are next actuated, both racks 31 and 32 acting simultaneously by means of like cams.

The end-flap-folding wings are clearly illustrated in their construction and various positions in Figs. 4 to 15, inclusive, and they consist of two parts, one of which, 38, is hinged at 39 close to each end of the folding-box and substantially in the plane of the top of the table k, the latter having holes 40 cut therein to permit the wings to fold down to a position substantially flush with the table.

Each of the folding-wings 38 has pivoted to the outer edge thereof, near each corner, a separate folding-wing 41, and attached to the latter are the yoke-frames 42, which consist of a narrow band of metal bent into U shape and secured by one end to the wings 41, extending downwardly and convergingly therefrom when the folding-wings are extended ready to receive the blank, as shown in Figs. 5, 7, and 10. Extending through these yoke-frames 42 transversely of the folding-box are pins 43, supported in the end of two arms 44, which extend toward each other and are secured to parallel shafts 45, rotatably supported in bearings 46 on the table. The hubs of the two arms 44 are provided with gear-teeth, as shown at 47, Fig. 9, whereby when one of the shafts 45 is rotated both of the arms will swing together up or down. One of the shafts 45 extends beyond the side of one of its bearings, as shown in said Fig. 9, and has secured thereto a gear 48, which extends through a slot in the table and meshes with a rack 50, which construction is clearly shown in Fig. 5. On the bottom of this rack are two projections 51 and 52, the former of which is struck by the cams 53 on the shaft r to move the rack to the right, the other projection being struck by the cam 54 on the shaft v to move the rack in the opposite direction. When this movement of the rack to the right takes place, the arms 44 will be swung upwardly from their position shown in Fig. 5 to the successive positions shown in Figs. 13 and 15. In Fig. 13 the wings 38 are shown as having reached the limit of their movement, and, extending, as they do, across the ends of the sides 26 of the folding-box, these wings come to a stop when they reach the position shown in Fig. 13. The continued upward movement of the ends of the arms 44 acting through the pins 43, which traverse the yoke-frames 42, will throw the wings 41 from their horizontal position (shown in said Fig. 13) to the position shown in Fig. 15—that is, folded down parallel with the wings 38—and in thus inclosing the two end flaps c at each end between the end flaps d and e pressing the locking-flaps f close against the bottom of the box and at right angles to the ends thereof. Just preceding the last movement of these folding-wings, whereby the locking-flap is pressed against the bottom of the box, the two rectangular levers 56 (shown in said Fig. 15) are actuated to move up against the under side of the locking-tongues g and bend them up to a vertical position, whereupon these fingers again retire in the manner to be described and the locking-tongues g spring down over the edge of the flaps f of the blank, thus completing the folding of the box, whereupon the rack 50 is by its cam 54 moved in the opposite direction, thus moving the arms 44 back again to the position shown in Fig. 5, whereupon another feeding movement of the fingers 7 takes place, bringing another blank toward the folding-box, the forwardly-extending end $7^a$ of one of said fingers pushing the completed box out of the folding-box.

Referring to Fig. 13, it will be seen that there are two thin springs 57 secured to the wings 38 and extending outwardly therefrom substantially in the plane of these wings in position to be engaged by the pins 43 as the arms 44 swing from the position shown in Fig. 13 to that shown in Fig. 15, whereby the last part of the movement of the folding-wings 41 will take place against the tension of these springs, which are designed to aid in the return movement of the wings and the arms 44, and they also prevent the wings 41 from being violently carried over to the position shown in Fig. 15 through the momentum of these parts of the machine when in operation.

Reference has been made to the levers 56, which bend up the locking-tongues $g$, as shown in Fig. 15, and this movement takes place as follows: These levers are supported in slots cut in the edge of a bar 59, which is carried on the end of a post 60, which extends through a boss 61 on the under side of the table, and the normal position of this bar and said lever is shown in Fig. 7. Extending through the post 60 is a pin 62, which supports one end of a spiral spring 63, the upper end of which bears on a shoulder on the boss 61, the lower end of this boss being slotted, as at 64, to permit vertical play to the pin 62, and whereby the post 60 may be prevented from rotating. A cam 66 on the shaft $r$ at the proper time swings against the under side of the lower end of the post 60 and moves it and the levers 56 toward the table, the long arms of these levers extending through holes in the table. The short upturned arms of these levers come against the under side of the table, and as the long arms move up against the tongues $g$ this contact of the short arms with the table throws the points of the long arms toward each other, thus bending back the locking-tongues, as shown, the swinging movement of these levers 56 taking place against the tension of springs 67, suitably disposed to bear thereon and secured to the under side of the bar 59. When the cam 66 moves out from under said post 60, the spring 63 forces the latter and the bar 59 downward, and the long arms of the levers 56 striking against the beveled edge of the holes in the table are swung back again to the position shown in Fig. 7, aided by the springs 67. When this movement of the bar 59 and the levers 56 has been accomplished, which movement will be just prior to the backward swinging movement of the folding-wings 38 41, the parts will occupy the positions shown in Figs. 4 and 5, ready to receive another blank, the plunger $t$ retiring out of the finished box simultaneously with the just-described movement of the folding-wings.

Having thus described my invention, what I claim, and desire to secure by Letters Patent of the United States, is—

1. In a box-folding machine, a folding-box having two parallel sides and open ends; a plunger to press a blank into said box to fold the sides and corner-flaps of the blank into vertical position relative to the blank, and in the same plane; corner-flap-folding fingers having a swinging movement toward the center of the blank in the plane of the latter; end-flap-folding wings comprising two wings at each end of the folding-box, both movable together and one being movable relatively to the other to press the end flaps of a blank one against the other to inclose the corner-flaps between them, together with means to effect the interlocking of a locking-flap on one of said end flaps with the bottom of the box to hold the end flaps in their folded position.

2. In a machine of the class described, a folding-box, and blank-feeding mechanism arranged to deliver blanks to said box, a plunger to press the blanks into the box, and successively-acting means to fold in corner-flaps and to fold end flaps over the corner-flaps, said means consisting of members to swing simultaneously toward the center of the blank, and of folding-wings consisting of two sections hinged together, and means to swing both of said wing-sections together and one toward, and into parallelism with, the other, to inclose the end flaps between them and to inclose the corner-flaps between the overfolded end flaps, together with means to effect the interlocking of one of the end flaps with the bottom of the box to hold the overfolded end flaps in folded position.

3. In a box-machine for folding a box-blank which is provided with a two-part end flap and a locking-flap forming part of one of the end-flap portions, a suitable folding-box having parallel sides and open ends, and a plunger therefor to suitably form the sides of the box; folding-wings located at each end of the box, and each consisting of two wing-sections one of which is pivotally supported to swing against the end of the folding-box and the other pivotally supported on the side of the first section and arranged to swing over the top of the latter and into parallel relation thereto inside the folding-box to bend the two parts of said end flaps one over against the other to form the end of the box, together with means to effect the interlocking of the locking-flap with the bottom of the box.

4. In a machine for folding a box-blank which is provided with an end flap which consists of two sections and a locking-flap, and which is provided also with a locking-tongue formed in the bottom of the box, the combination with a folding-box having parallel sides and open ends, of a plunger to press the blank into the box to form the sides of the latter, folding-wings to bend the two end-flap sections one against the other in position to close the end of the box, and to press the locking-flap against the bottom of the box, and a lever located beneath the folding-box and arranged to bend up said locking-tongue in advance of the actuation of the folding-wings, whereby said locking-flap may be positioned to be engaged by said locking-tongue upon the withdrawal of said tongue-actuating lever.

5. In a machine for folding a box-blank provided with end flaps consisting of two sections joined together, and a locking-flap on one of said flap-sections, and provided also with a tongue punched out of the blank, a feeding device for the blank consisting of a sliding member to withdraw the lower one of a pile of blanks, a device slidable at right angles to said sliding member and provided with means thereon to engage the opening in the blank formed by the punching out of said tongue, said device being slidable toward and from a folding-box on the machine, and a plunger on the machine to remove the blank from said slidable device at the proper time.

6. In a machine for folding a box-blank which comprises a body having side flaps, corner-flaps, and end flaps consisting of two sections joined together, and a locking-flap on the outer section of the end flaps, the combination with a folding-box having parallel sides and open ends, and a plunger for said folding-box of the following mechanisms, viz: feeding mechanism to position a blank on the folding-box and actuating means for the plunger to press the blank into the box; mechanism to simultaneously bend the corner-flaps at right angles to the side flaps, end-flap-folding mechanism, and mechanism to effect the engagement of the locking-flap with the bottom of the box to hold the end flaps in folded position.

7. In a machine for folding box-blanks of the character described, the combination with a folding-box having parallel sides and open ends, of end-flap-folding wings consisting of two wing-sections one hinged to swing against the open end of the box and the other hinged on the border of the first wing to swing over said border to a position parallel with the first wing to fold the parts of a two-part end flap one against the other, said end-flap-folding wings permitting a blank to be received in a horizontal position, the area of the extended folding-wings being equal to the area of the end-closing portion of the end flap, means to fold the end flap to a vertical position, means to fold a portion of the flap upon itself and against that portion of the vertically-folded flap equal in height to the box, and force the remaining portion of the end flap against the bottom of the box as described.

8. In a machine for folding box-blanks of the character described, the combination with a folding-box and a plunger therefor having vertical reciprocating movements relative to the box, of a feeding mechanism comprising a slide movable reciprocally beneath a pile of blanks to withdraw a blank therefrom, and a slidable feeding member and feeding-fingers thereon movable rectangularly relative to said slide and toward and from the folding-box to move a blank into position on the folding-box, said feeding-fingers having means thereon to extend into openings in the blank, the movement of the plunger serving to separate the blank from said feeding-fingers.

JOSEPH H. SHEARN.

Witnesses:
K. I. CLEMONS,
WM. H. CHAPIN.